US006965989B1

(12) United States Patent
Strange et al.

(10) Patent No.: US 6,965,989 B1
(45) Date of Patent: Nov. 15, 2005

(54) SYSTEM AND METHOD FOR FAST REBOOT OF A FILE SERVER

(75) Inventors: Stephen H. Strange, Mountain View, CA (US); Alan L. Rowe, San Jose, CA (US); R. Guy Lauterbach, Penn Valley, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 596 days.

(21) Appl. No.: 09/929,527

(22) Filed: Aug. 14, 2001

(51) Int. Cl.[7] .............................................. G06F 1/24
(52) U.S. Cl. .............................. 713/1; 713/2; 709/220; 709/222
(58) Field of Search ........................ 713/1, 2; 709/219, 709/220, 221, 222

(56) References Cited

U.S. PATENT DOCUMENTS

| | | | | |
|---|---|---|---|---|
| 4,763,333 A | * | 8/1988 | Byrd ........................... | 714/22 |
| 5,163,131 A | | 11/1992 | Row et al. | |
| 5,355,453 A | | 10/1994 | Row et al. | |
| 5,485,579 A | | 1/1996 | Hitz et al. | |
| 5,802,366 A | | 9/1998 | Row et al. | |
| 5,819,292 A | | 10/1998 | Hitz et al. | |
| 5,931,918 A | | 8/1999 | Row et al. | |
| 5,935,242 A | * | 8/1999 | Madany et al. ................ | 713/1 |
| 5,941,972 A | | 8/1999 | Hoese et al. | |
| 5,948,110 A | | 9/1999 | Hitz et al. | |
| 5,950,225 A | | 9/1999 | Kleiman | |
| 5,963,962 A | | 10/1999 | Hitz et al. | |
| 5,978,913 A | * | 11/1999 | Broyles et al. ................ | 713/2 |
| 6,014,744 A | * | 1/2000 | McKaughan et al. .......... | 713/2 |
| 6,038,570 A | | 3/2000 | Hitz et al. | |
| 6,065,037 A | | 5/2000 | Hitz et al. | |
| 6,119,244 A | | 9/2000 | Schoenthal et al. | |
| 6,138,126 A | | 10/2000 | Hitz et al. | |
| 6,425,035 B2 | | 7/2002 | Hoese et al. | |
| 6,434,696 B1 | * | 8/2002 | Kang ............................ | 713/2 |
| 6,591,376 B1 | * | 7/2003 | VanRooven et al. .......... | 714/36 |
| 6,711,675 B1 | * | 3/2004 | Spiegel et al. ................ | 713/2 |
| 2002/0129191 A1 | * | 9/2002 | DaCosta ...................... | 711/103 |

* cited by examiner

*Primary Examiner*—Rehana Perveen
(74) *Attorney, Agent, or Firm*—Cesari and McKenna, LLP

(57) ABSTRACT

A system and method for fast ("warm") reboot of a file server is provided, which skips certain conventional boot processes when circumstances warrant, in order to reduce server downtime. In particular, time is saved by avoiding a full shutdown of the processor and memory, and by causing the firmware to refrain from a full clearance of the file server memory. Instead, the firmware accesses a retained copy of the storage operating system kernel from a reserved location in the file server memory so that an operative version of the kernel is reestablished at the appropriate address space in memory without requiring a time-consuming read of the kernel image from disk. In addition, other "normal" (cold) reboot operations such as full memory tests, hardware checks and memory zeroing are avoided as appropriate—saving further time in the overall reboot process, while still attaining the desired reinitialization of key applications and functions.

71 Claims, 5 Drawing Sheets

SYSTEM AND METHOD FOR FAST REBOOT OF A FILE SERVER

FIELD OF THE INVENTION

This invention relates to networked data storage systems, and more particularly to reboot techniques for storage system file servers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a storage system that implements file system semantics and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Within a known storage system, the storage operating system is loaded from a kernel image that resides in compressed form at a location on the interconnected disk array. The compressed kernel image is located on the disk array by a finder algorithm, and loaded at an appropriate location in memory. It is then extracted into an operative kernel based upon a decompression algorithm, and placed in a predetermined address space in the file server's memory.

Briefly, the kernel image is loaded initially at boot-up of the file server in response to a series of commands executed by firmware (FW) that resides on the file server's system circuit board (mother board), in communication with other file server components. The firmware includes a set of basic operating instructions stored on a programmable read-only memory (an EPROM), such as a Flash memory—performing a function analogous to a basic input/output system (BIOS) in a personal computer. That is, the firmware is the first command instruction set to be accessed by the file server's processor (after internal instructions) when power-on is applied. These instructions allow disk access and other basic functions that enable loading of the complete operating system from the disk array (or other fixed storage location).

The full "reboot" of a file server involves, in essence, the complete shutdown and clearance of the processor and memory from a booted-up state, and (often) a recycling of system power. After shutdown, the entire system is reinitialized and the memory is reloaded with all necessary software and operating system components. A reboot sequence may be undertaken for a variety of reasons. Reboot may be required due to power-failure or hardware failure. A system error, unexpected internal software state, software bug and/or kernel "panic" condition may necessitate a reboot (in order to correct these conditions). The addition of new hardware, adapters or drivers may also necessitate reboot—particularly the attachment of new disk units to the attached disk array. Various hardware and software checks and maintenance procedures may also entail a reboot sequence.

A file server typically performs the following operations (among others) during a traditional reboot sequence:

As shutdown occurs, all applications are closed, consistency points and other closing data handling/file service activities are completed (as applicable) and connections with clients are brought down. The file server memory is then cleared by a "handoff" to the firmware, based upon a call for a "reboot" by the storage operating system. This clears the final memory locations, and handles the final shutdown of processor and memory functions.

Once boot-up subsequently begins, a series of steps generally occur. The firmware instructs an initial full file server memory test, scanning the memory for errors and clearing any built-in Error Correction Circuitry (ECC) bits (if applicable). This test may last thirty seconds or more on a large-memory (one-gigabyte and greater) file server. Other conventional power-on self-tests (POSTs) are also implicated at this stage. The useable file server memory is zeroed by the firmware, and various hardware chips may undergo power-up tests, such as the LCD display chip and the serial input/output (SIO) chip(s). The firmware now also locates the data-compressed image of the storage operating system kernel stored on disk, and loads the compressed image into an appropriate memory address space. The locating and reading of the kernel from disk into memory may consume approximately ten seconds on a fast-running file server. Once the kernel is loaded, various hardware connections are established and checked, and tests of attached hardware may be performed (PCI/bus-based devices, for example).

A full or "cold" boot process as a result of a reboot command, therefore, consumes significant file server time and resources. Clearly, the more quickly a reboot is accomplished, the less time clients awaiting file service must wait for that service to resume. Because reboot time is downtime from the perspective of clients, saving even a few seconds during reboot can significantly affect overall system availability—particularly where many attached clients exist and a multiplicity of reboots may be required throughout an operating year. In fact, to attain 99.999% system reliability (the desired "Five Nines"), downtime must be limited to only about five minutes per year.

It is recognized that certain boot-up processes may be avoided in many circumstances, as the risk of malfunction or failure of the subject hardware and software affected by these processes is low in such instances. In other words, where a reboot is undertaken simply to (for example) add a new disk drive or license a new module in the storage operating system, it is not usually expected that there are faults with any hardware or software components. As such, tests on unaffected components and software may (for all practical purposes) safely be skipped. Other time-consuming tasks may also be skipped under certain circumstances.

It is therefore an object of this invention to provide a system and method for faster reboot of a file server than a conventional "cold" reboot that does not appreciably increase the risk of propagation of a software or hardware error/failure. This system and method should generally reduce downtime as a result of file server unavailability.

SUMMARY OF THE INVENTION

This invention overcomes the disadvantages of the prior art by providing a system and method for fast ("warm") reboot of a file server that skips certain conventional boot processes (e.g. "cold reboot") when circumstances warrant, in order to reduce server downtime. In particular, time is saved by avoiding a full shutdown of the processor and memory, and by causing the firmware to refrain from a full clearance of the file server memory. Instead, the firmware accesses a retained copy of the storage operating system kernel from a reserved storage location in the file server memory so that an operative version of the kernel is reestablished at the appropriate address space in memory without requiring a time-consuming read of the kernel image from disk.

In addition, other "normal" or full reboot operations (such as full memory tests, hardware checks and memory zeroing by the firmware) are avoided as appropriate—saving further time in the overall reboot process, while still attaining the desired reinitialization of key applications and functions. The skipping of such reboot processes can be made based upon procedures written into the firmware that respond to the setting of a "warm reboot" flag in the firmware by the storage operating system as reboot is instructed. The tests and reboot procedures performed or skipped can be varied to suit a particular condition of hardware/software configuration.

In one embodiment a short-term compressed kernel image is stored in a low memory address and uncompressed/extracted into the operative storage operating system kernel in the predetermined location in memory by a boot loader within the short-term image. For the warm reboot, the short-term compressed kernel image is loaded from the reserved location—in contrast to a standard reboot in which the short-term kernel is loaded from the disk array copy. The subsequent reboot steps are the same during and after kernel extraction regardless of the source of the image (e.g. reserved memory or disk). The reserved location's compressed kernel image is reloaded from the disk-originated short-term copy each time a full reboot occurs, thus allowing for the clearance of the entire memory (including the reserved location) by the firmware during a normal full shutdown/reboot.

The stored compressed kernel image is error-checked each time it is retrieved for reloading into the short-term image and, in turn, into the operative uncompressed kernel. If it has been corrupted, the warm reboot reverts to a full reboot, ensuring that a new, disk-originated copy of the compressed kernel image is loaded in the short-term position and, whence, stored in the reserved location.

In one embodiment, the memory, including the reserved storage location, can be refreshed using, for example, a time-based Error Correction Circuitry (ECC) "sniffer" that periodically checks for memory ECC errors. This assists in maintaining the long-term stored compressed kernel image in the reserved storage location free of corruption to its code.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
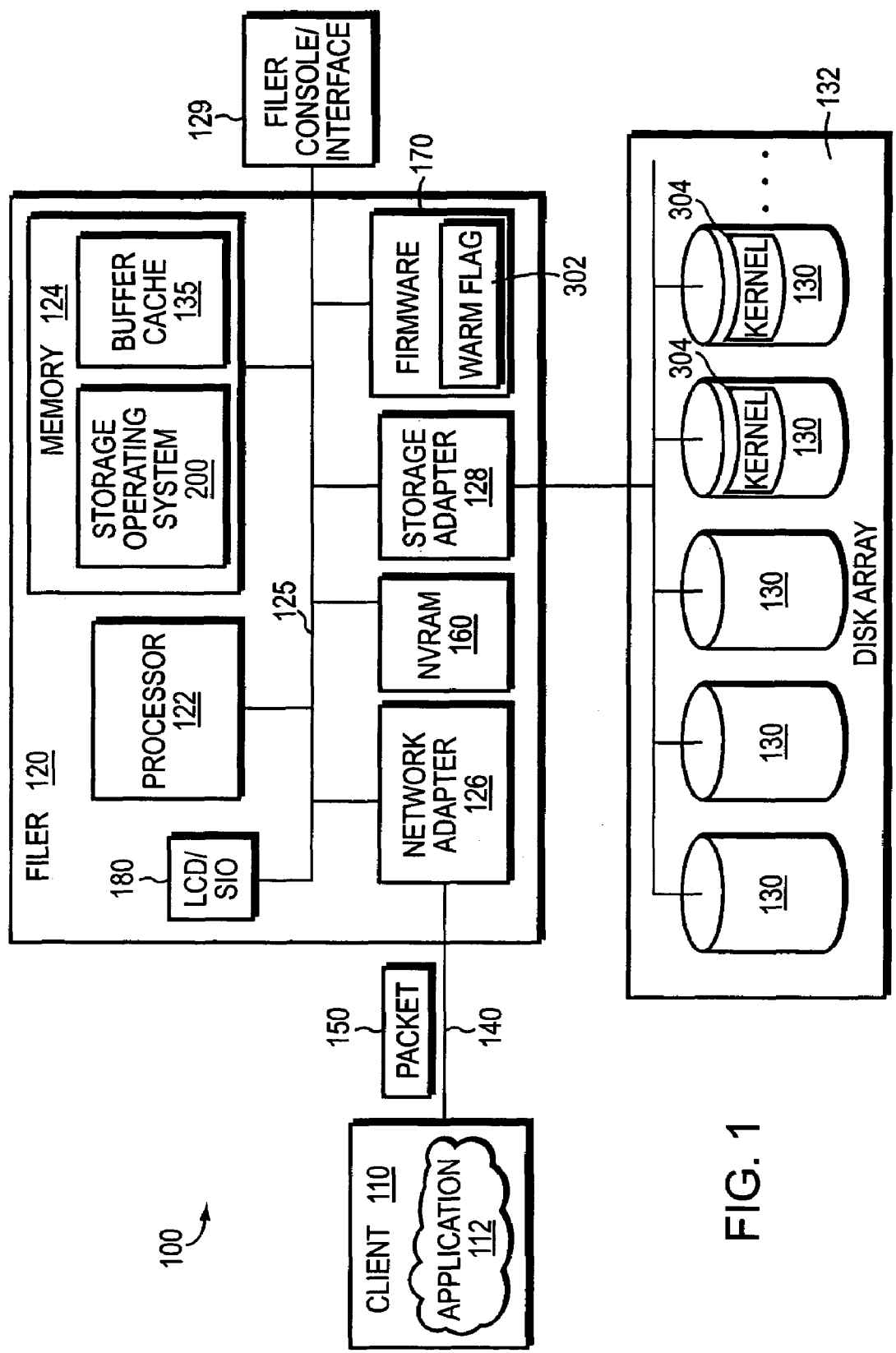
FIG. 1 is a schematic block diagram of a network environment including a file server and disk array that may be advantageously used with the present invention.

FIG. 1 is a schematic block diagram of an environment 100 that includes a client 110 having one or more applications 112, and interconnected file server 120 that may be advantageously used with the present invention. The file server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Notably, the Filer 120 includes an NVRAM 160 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disk array 132 is arranged as a plurality of separate volumes each having a file system associated therewith, as described further. The volumes each include one or more RAID groups of disks 130. In one embodiment the RAID groups can each include independent physical disks 130 including those storing striped data and those storing separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

In addition to the above-described NVRAM, a firmware storage device 170 (referred-to generally as the "firmware" or "FW") is operatively interconnected with the filer's (120) components. The firmware 170 includes a basic instruction set stored on a non-volatile memory, such as a flash memory (a PC card-based compact flash, for example). The firmware is thus readily rewritten on the flash to account for updates and changes in the underlying code. The storage operating system directs the rewriting of the flash through an appropriate application. A bus interface (not shown) allows the firmware to communicate over the system bus 125. This bus interface can be based on a variety of protocols, such as a Peripheral Component Interface (PCI) standard or Integrated Device Electronics (IDE) standard. Notably, the firmware provides the most-basic instruction set to restart a cold (uninitialized and/or powered-down) system, and to perform the final steps in bringing-down the system when a more-comprehensive instruction set (in the form of a storage operating system kernel) is not present.

Accordingly, for purposes hereof, the term "boot mechanism" shall in general refer to any mechanism, whether implemented in hardware, firmware, software or a combination thereof, for controlling boot-up and reinitialization of a file server. Also, while the firmware is stored in a non-volatile memory according to this embodiment, it is expressly contemplated that it can reside in a variety of other filer-accessible locations and in a variety of forms (such as a backup hard drive, optical storage, magnetic tape, etc.).

To facilitate generalized access to the disks 130 on the array 132, the storage operating system 200 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is preferably the NetApp® Data ONTAP™ operating system available from Network Appliance, Inc., Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The organization of the preferred storage operating system for the exemplary filer is now described briefly. However, it is expressly contemplated that the principles of this invention can be implemented using a variety of alternate storage operating system architectures.

Figure 2:
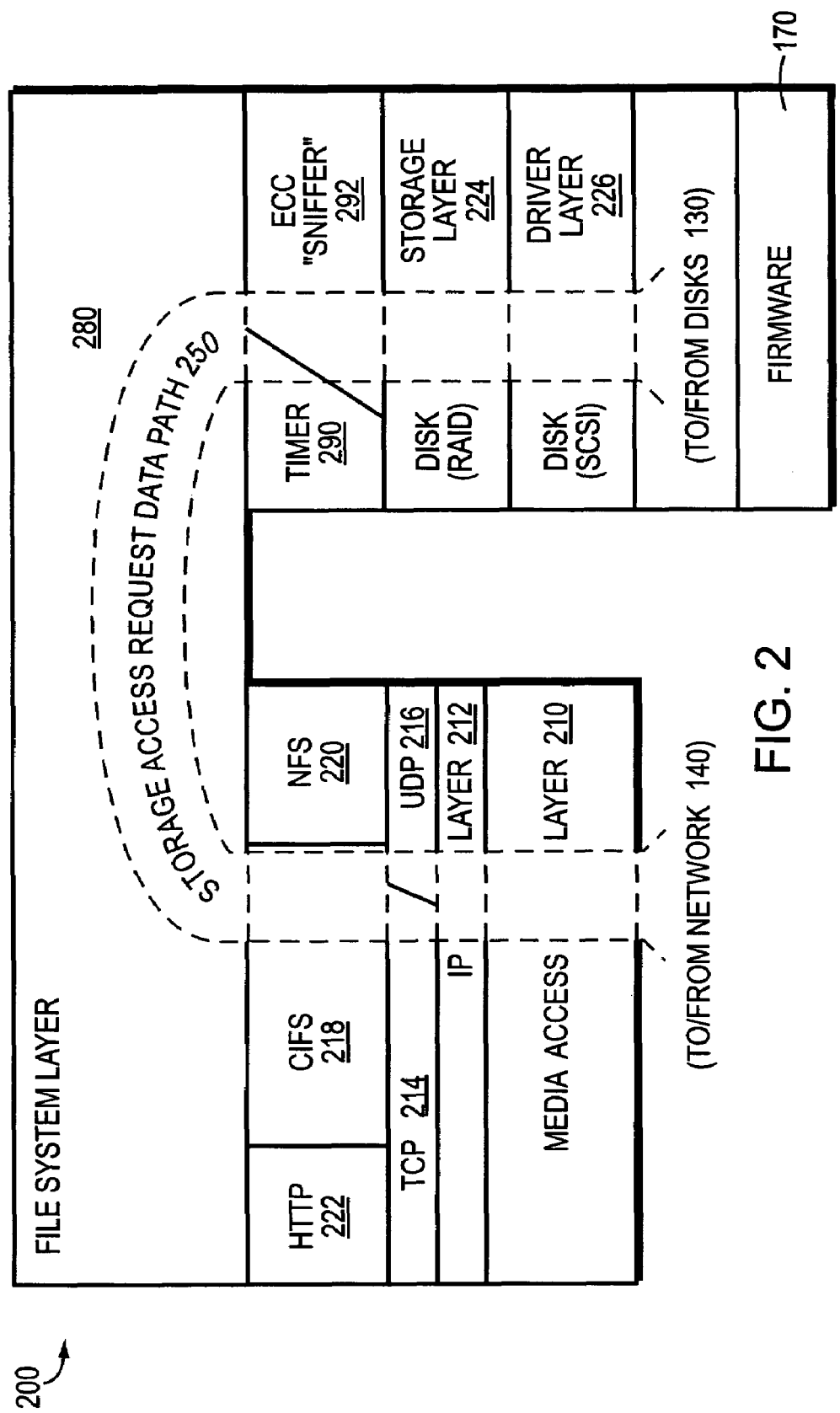
FIG. 2 is a schematic block diagram of an operating system file system layer that may be advantageously used in connection with the file server of FIG. 1.

As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

The firmware 170 is shown in connection with the storage operating system 200 residing beneath the disk layer (FIG. 2). The firmware thus interacts with the disks and operating system in a manner to be described further below. In addition, a system timer 290 and an Error Correction Circuit (ECC) "sniffer" 292 are shown according to an embodiment of this invention. These functional components of the storage operating system are described in further detail below. In general, they are responsible for performing periodic ECC bit-checking operations on the filer's memory array, using an appropriate working thread, to ensure correct storage of bits.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

It will be understood to those skilled in the art that the inventive technique described herein may apply to any type of special-purpose computer (e.g., server) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

Figure 3:
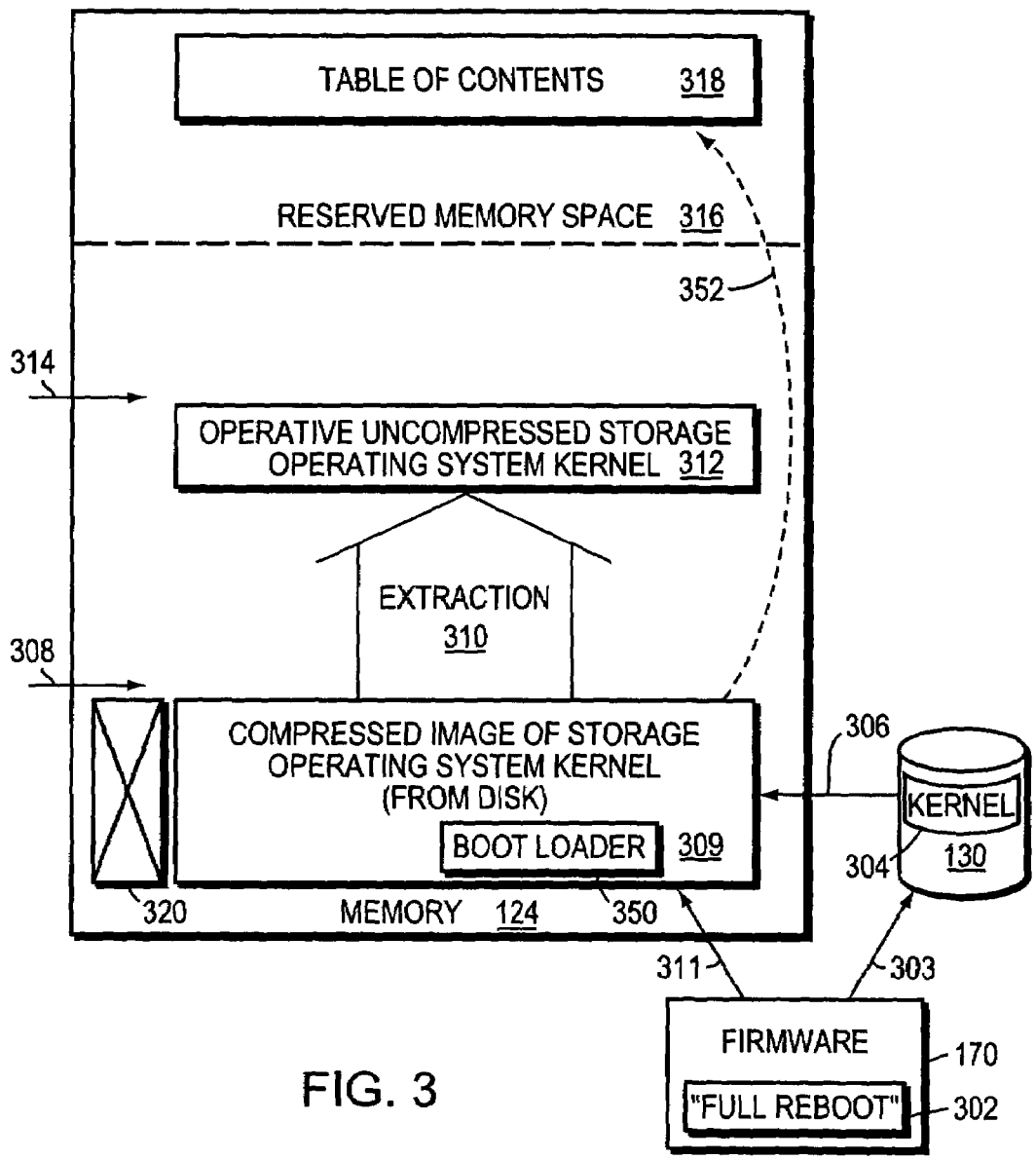
FIG. 3 is a schematic block diagram of the file server memory showing a generalized representation of the loading of a storage operating system kernel image into the memory from disk in accordance with a "normal" reboot process.

FIG. 3 graphically represents the filer memory 124 undergoing a full or "cold" reboot process according to an embodiment of this invention. When a full reboot instruction is issued to the storage operating system, the above-described shutdown occurs, in which the memory is cleared by the firmware 170 after it is instructed to do so. In this instance a flag 302 (to be described further below) is set to instruct a full reboot (cold reboot) of the system. All normal reboot shutdown operations are performed including the complete clearance of the memory 124 including all versions of the kernel, in both compressed and uncompressed form.

Once clearance is complete, the boot-up process begins. The firmware 170 begins various standard POST activities, memory scan, various hardware tests (LCD and SIO chips 180 in FIG. 1). The firmware then searches (arrow 303) for a compressed image (304) of the storage operating system kernel on one or more disks 130 of the array using an appropriate algorithm/application. The on-disk compressed kernel image 304 is stored in one or more files on one or more disks (see for example FIG. 1).

The firmware facilitates the reading (arrow 306) of the compressed kernel image 304 into the memory 124, at a predetermined (typically) "low" address value 308. This becomes a short-term version of the compressed kernel image (309). When an appropriate action by the firmware is completed (such as the jumping back to the start value—arrow 311), the compressed image undergoes a conventional self-extraction procedure 310. The extracted, operative version of the storage operating system kernel (312) is loaded into a predetermined address space 314, that is within the unreserved area of the filer memory 124. Note that a reserved memory space 316 is also established. This space includes a table of contents 318 containing pointers to predetermined memory locations, and its role is described in further detail below.

Once the operative kernel 312 is established in its predetermined address space, it is started, and takes over additional boot-up operations from the firmware 170. In addition, the memory space 308 occupied by the in-memory compressed kernel image 309 is freed (indicated by cross-block 320) for overwrite.

Figure 4:
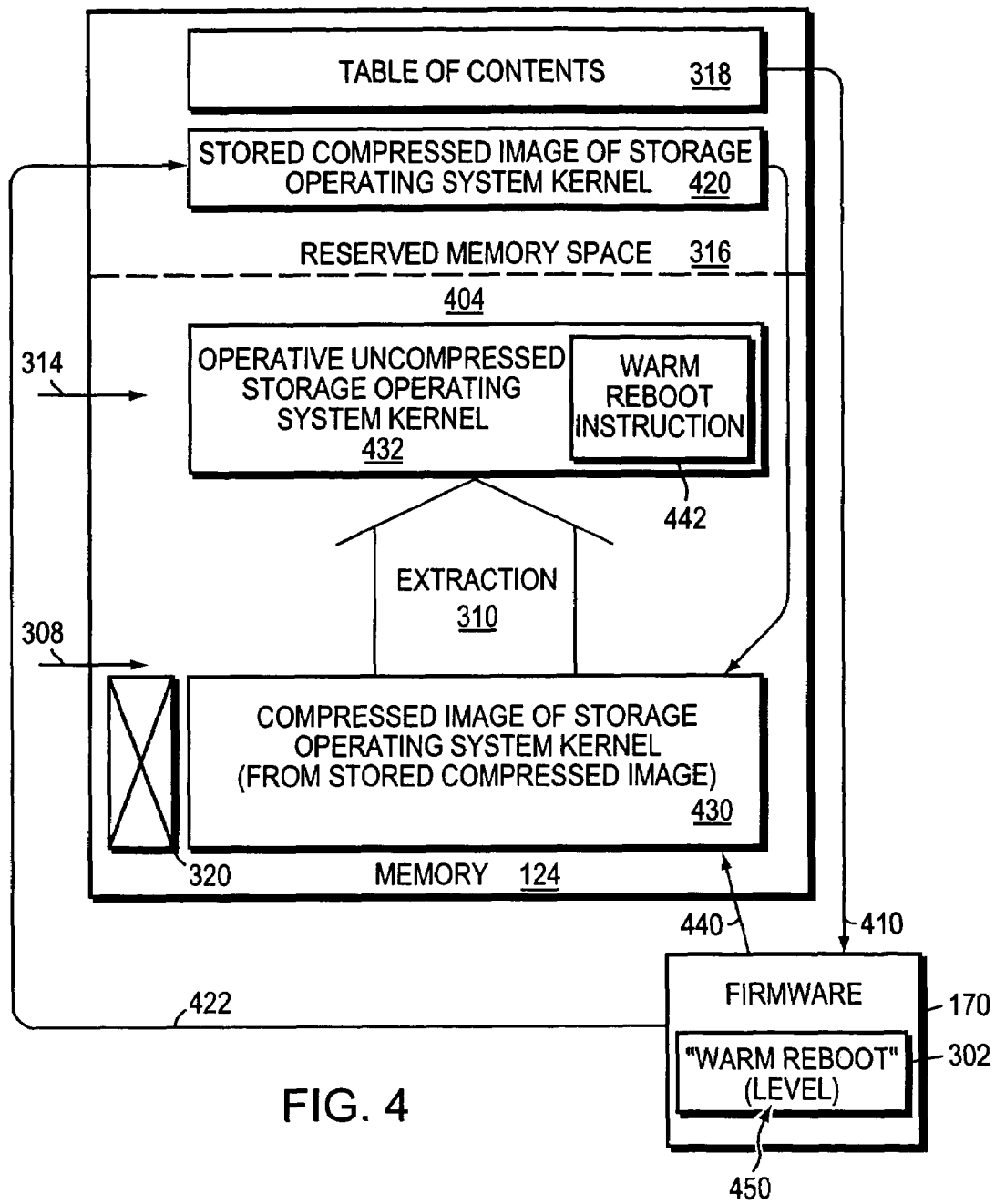
FIG. 4 is a schematic block diagram of the file server memory showing a generalized representation of the loading of a storage operating system kernel image the memory from a stored compressed image in accordance with a "warm" reboot process.
Figure 5:
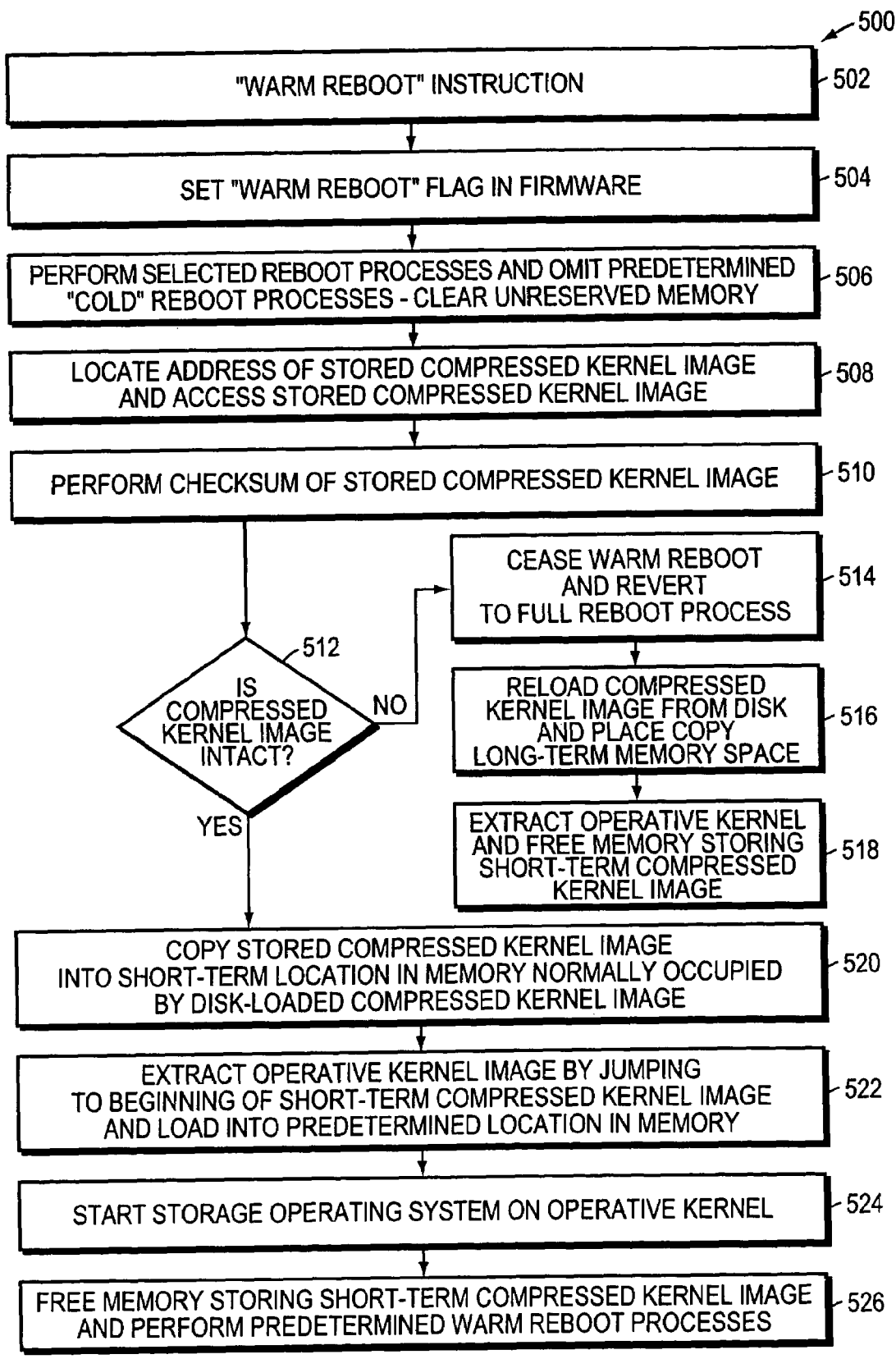
FIG. 5 is a flow diagram showing a warm reboot process according to an embodiment of this invention.

With reference now to the representation of the memory 124 in FIG. 4 and the associated flow diagram in FIG. 5, a warm reboot process in accordance with an embodiment of this invention is now described in detail. The process 500 (FIG. 5) begins when an action occurs that warrants a reboot, but does not require a full reboot. One type of warm reboot condition involves the direct instruction from an operator via the filer console/interface 129. This may be in preparation for adding a new licensed software module or attaching a new disk drive. Conversely, a warm reboot can be initiated by certain internal storage operating system "panic" conditions, such as a detected software bug, unexpected internal software state or a hardware error that can be cleared by rebooting (a multi-disk failure for example). Note that certain types of errors that are fatal to the storage operating system, such as power cycles, halts, panics during booting, machine checks and instruction faults require resort to a normal "cold" boot.

A valid internal or external warm reboot instruction (see 442 in FIG. 4) within the storage operating system kernel is issued (step 502 in FIG. 5), directs the flag 302 in the firmware 170 to be set to a value (see also FIG. 4) indicating an impending warm reboot process (step 504). This flag can be a bit, or other data structure. At this time, the storage operating system performs certain shutdown procedures, including the above-described "handoff" to the firmware 170, in accordance with step 506. The firmware does not completely shut down the power, memory and processor. It does cause the reload the storage operating system kernel in accordance with generalized reboot procedures. The loading is from a compressed kernel image in the reserved space 316.

As noted above, the highest-value address space 316 is reserved, and not cleared by either the operating system or firmware at this time. Within this space 316 is located a table of contents 318 (sized approximately 512 bytes) storing various pointers to reserved information within the space 316 used by the firmware 170. The space 316 is not accessible to the storage operating system during normal operations. The firmware 170 accesses (arrow 410) the table of contents 318 and, in accordance with step 508, locates the address of a stored version of the compressed kernel image (420). This version is a copy of the compressed image 304 contained on-disk, and the version loaded into memory during a cold reboot (as the short-term compressed kernel image 309). Because the stored compressed kernel image is located in the reserved memory, it is not lost by action of the storage operating system during shut down/reboot, as this area is not generally visible to the kernel. Accordingly, in a warm reboot where the firmware 170 prevents full shutdown, the information in the reserved space, including the stored compressed kernel image 420, is retained.

Before discussing the warm reboot process 500 further, the loading of the stored compressed kernel image is discussed in further detail. When a full boot-up occurs, a boot loader 350 (refer to FIG. 3) that resides at the beginning of the short-term kernel image 309 instructs a copy of the on-disk compressed kernel image to be copied (dashed arrow 352) to the reserved space 316, and its location be noted in the table of contents 318. This occurs, typically, after the short-term compressed kernel image 309 is loaded to the low address space location 308, but before extraction (310) of the operative storage operating system kernel occurs. According to one embodiment, the firmware and/or storage operating system may include additional checking/update functions that ensure that the stored compressed kernel image remains intact, and if it becomes corrupted, that a new copy will be directed to the reserved space. As a minimum it is generally contemplated that a new stored kernel image is loaded in the reserved space each time a cold reboot occurs.

Referring again to the procedure 500, the firmware accesses (arrow 422) the stored compressed kernel image 420, and performs a checksum (or other error-checking protocol) on the kernel image in accordance with step 510. In accordance with decision step 512, if the stored compressed kernel image 420 is corrupted, the warm reboot ceases and the firmware resets the flag 302, reverting to a normal cold reboot process (step 514). In the manner described generally above, the shutdown procedure ensues, and a reboot with all applicable tests occurs. In addition, a new on-disk compressed image of the kernel (304) is loaded, and a copy is placed in the reserved space 316 (step 516). Finally, the operative kernel is extracted, and loaded at its predetermined address space, while the space storing the short-term compressed kernel image is freed (step 518).

Conversely, if the stored compressed kernel image 420 is intact, the decision step 512 branches to step 520. The stored compressed kernel image is written to the predetermined address space 308 normally occupied by the disk-read compressed kernel image 309 (as compressed kernel image 430). As with a cold reboot (FIG. 3), the short-term compressed kernel image 430 is extracted (310) and loaded at the predetermined address space 314 as the operative storage operating system kernel 432 (step 522). This occurs based upon the above-described self-extraction procedure in which the firmware 170 jumps (arrow 440) to the first address of the compressed kernel image 430. Note that this multi-copy approach enables other functionalities within the operating system and firmware to remain relatively unaffected, as only the origin of the short-term compressed kernel image (disk or reserved space) is altered. It is contemplated, according to an alternate embodiment, that the stored compressed kernel image can be directly extracted from the reserved space into the desired address space (314). Likewise, the kernel can be uncompressed in storage, or only partially compressed according to an alternate embodiment.

Once the storage operating system kernel 432 is loaded, it starts normal operations (step 524). While the full clearance (zeroing) of the memory by the firmware is typically skipped in the warm reboot process, a clearance of memory locations is instead performed on an as-needed basis by the kernel, once the kernel is established (uncompressed and extracted) in its predetermined address space. Likewise, the address space 308 storing the short-term compressed kernel image 430 is now freed, as the compressed image is no longer required.

It is generally contemplated that the compressed kernel image is stored on a form of "non-removable" storage media in each instance according to an embodiment of this invention. That is, the image in the reserved storage location is on a first non-removable (typically volatile) storage media, namely the file server's random access memory (RAM). The image is alternately stored on a second non-removable (typically non-volatile) storage media, namely the disk array. It is contemplated that the types of storage media in each instance can vary from those described, but that they are generally fixed with respect to the system (including so-called "hot-swappable" disk implementations). They would typically not include so-called "boot-disks" stored on floppy media, CD-ROMs, and the like. In addition the kernel image in one of the media is generally more-quickly accessible than the standard media used for storing the kernel image (traditional on-disk storage, for example), advantageously reducing access time.

In addition, it is expressly contemplated, according to an alternate embodiment, that the firmware's warm reboot flag can be a multi-state indicator capable of directing different "levels" of warm reboot, depending upon the prevailing conditions. In other words, the flag 302 includes an optional "level" value (450 in FIG. 4), potentially represented by a two- or more-bit flag. The storage operating system can be adapted to set the level based upon a given condition. If certain hardware errors, for example, are more likely under certain conditions, a given test (that would otherwise be skipped) can be reintroduced into the warm reboot. The control of the level of warm reboot can, likewise be input by the operator when he or she directs a warm reboot.

Since a file server may not experience a full reboot for several days, weeks or, possibly, months as an advantageous consequence of the warm reboot process of this invention, it is contemplated that the stored compressed kernel image may reside in the reserved space for a significant time period, unchanged. This may tax the ability of most Synchronous Dynamic Random Access Memory (SDRAM) or other memory to retain the data. Such memory is often provided with error checking, refresh and repair capabilities, such as ECC. This circuitry searches out single-bit errors before they can become potentially fatal double-bit errors. However, these functions are often only carried out at full reboot. Accordingly, it is contemplated that the timer function can be called to control an ECC "sniffer" application that searches out single-bit errors according to a gradual programmed schedule. According to one embodiment, the ECC sniffer passes over the entire memory space (including the reserved space) once per day, in, for example, clusters of a few kilobytes every few minutes. The schedule for maintenance of the memory, however, is highly variable.

The foregoing has been a detailed description of illustrative embodiments of the invention. Various modifications and additions can be made without departing from the spirit and scope of the invention. For example, a variety of reboot procedures and tests, other than those discussed herein, may be included and/or omitted in a warm reboot process according to this invention. Likewise, the general structure of the file server memory, and the locations of various copies of the compressed and/or uncompressed kernel can be varied. In addition, the stored kernel image may be located directly on the firmware storage device. This may be a compressed copy or an uncompressed copy. In any case, the copy (wherever stored) is made available for loading to memory when a warm reboot occurs according to an illustrative embodiment. It is also expressly contemplated that the procedure described herein can be adapted to revert from a warm reboot to a cold reboot if, for any reason, the performance of the warm reboot is detected as causing potential harm to the software or hardware of the system. Appropriate fault-detection protocols can be implemented to generate a full reboot command when needed. Further reference to a firmware is only one type of arrangement, and the term as used herein should be taken broadly to include any acceptable "boot mechanism" that can carry out the principles of this invention. Finally, it is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example, and not to otherwise limit the scope of the invention.

What is claimed is:

1. A method for fast reboot of a computer having an attached disk array and an internal random access memory (RAM) comprising the steps of:
    retaining a copy of an operating system kernel at a reserved storage location of the RAM;
    performing predetermined reboot operations with a boot mechanism; and
    reloading an operative operating system at a location in the RAM based upon the copy of the operating system kernel retained at the reserved storage location, after the step of performing the predetermined reboot operations.

2. The method as set forth in claim 1 wherein the boot mechanism is adapted to perform predetermined full reboot steps based upon a full reboot instruction from the operating system, and wherein the predetermined reboot operations omit the predetermined full reboot steps when the operating system is reloaded from the reserved storage location based upon a warm reboot instruction so as to perform a less-than-full reboot.

3. The method as set forth in claim 2 wherein the predetermined full reboot steps include loading into the memory a copy of the operating system kernel from the attached disk array, and the predetermined full reboot steps further include at least one of (a) fully clearing of the RAM, including the reserved storage location, and (b) fully testing the RAM.

4. The method as set forth in claim 3 wherein the predetermined full reboot steps further include testing at least one of an LCD display chip and a Serial Input/Output (SIO) chip.

5. The method as set forth in claim 2 wherein the copy of the operating system kernel comprises a compressed image of the operating system kernel adapted to be uncompressed and extracted to form the operative operating system kernel at the location in the RAM.

6. The method as set forth in claim 5 wherein the step of reloading includes loading the compressed image of the operating system kernel from the reserved storage location to a space within the RAM and thereafter uncompressing and extracting the operative operating system kernel into the RAM from the compressed image of the operating system loaded into the RAM.

7. The method as set forth in claim 6 further comprising, after the step of uncompressing and extracting, freeing-for-overwrite the space within the RAM into which the compressed image of the operating system kernel is loaded.

8. The method as set forth in claim 6 wherein one of the predetermined full reboot steps comprises copying the compressed image of the operating system kernel into the reserved storage space from the compressed image of the operating system kenrel in the RAM.

9. The method as set forth in claim 2 wherein one of the predetermined reboot steps comprises loading the operating system kernel at the reserved storage location based upon a copy of the operating sytem kernel on the attached disk array.

10. The method as set forth in claim 2 further comprising providing a warm reboot instruction in response to a condition that enables the less-than-full reboot of the computer.

11. The method as set forth in claim 10 wherein the condition includes at least one of a user-generated warm reboot command and a predetermined software panic condition that can be repaired by the less-than-full reboot of the computer.

12. The method as set forth in claim 10 wherein the step of providing the warm reboot instruction includes setting a flag in the boot mechanism from a full reboot state to a warm reboot state.

13. The method as set forth in claim 10 further comprising reverting to the full reboot if the copy of the data is corrupted.

14. A system for performing a fast reboot of a computer having an attached disk array and an internal memory comprising:
a boot mechanism that carries out full reboot operations on the computer, the boot mechanism including a flag adapted to indicate performance by the boot mechanism of either (a) the full reboot operations or (b) warm reboot operations wherein at least one of the full reboot operations is skipped, including a loading of data from the disk array that generates the operating system kernel at a predetermined kernel location in the memory.

15. The system as set forth in claim 14 wherein the full reboot operations that are skipped include a full test of the memory, a zeroing of the memory, and a shutdown of a processor of the computer.

16. The system as set forth in claim 14 wherein the memory includes a reserved storage space that stores a copy of data from which the operating system is loaded into the predetermined location in the memory during the warm reboot operations, the boot mechanism being adapted to retain uncleared the reserved storage space during the warm reboot operations, and being adapted to clear the reserved storage space during the full reboot operations.

17. The system as set forth in claim 16 wherein the copy of the data stored in the reserved storage space is a compressed image of the operating system kernel and the boot mechanism is adapted to load the compressed image of the operating system kernel from the reserved storage space into a space in the memory outside the reserved storage space, and further comprising a boot loader that subsequently uncompresses and extracts the compressed image of the operating system kernel at the space in the memory outside the reserved storage space to generate the operating system kernel at the predetermined kernel location in the memory.

18. A computer-readable medium including program instructions executing on a computer for fast reboot of a computer having an attached disk array and an internal random access memory (RAM), the program instructions performing the steps of:
retaining a copy of an operating system kernel at a reserved storage location of the RAM;
performing predetermined reboot operations with a boot mechanism; and
reloading an operative operating system kernel at a location in the RAM based upon the copy of the operating system kernel retained at the reserved storage location after the step of performing the predetermined reboot operations.

19. The computer-readable medium as set forth in claim 18 wherein the boot mechanism is adapted to perform predetermined full reboot steps based upon a full reboot instruction from the storage system, and wherein the predetermined reboot operations omit the predetermined full reboot steps when the operating system is reloaded from the reserved storage location based upon a warm reboot instruction so as to perform a less-than-full reboot.

20. The computer-readable medium as set forth in claim 19 wherein the predetermined full reboot steps include loading into the memory a copy of the operating system kernel from the attached disk array, and the predetermined full reboot steps further include at least one of (a) fully clearing of the RAM, including the reserved storage location, and (b) fully testing the RAM.

21. The computer-readable medium as set forth in claim 20 wherein the predetermined full reboot steps further include testing at least one of an LCD display chip and a Serial Input/Output (SIO) chip.

22. A method for carrying out a warm reboot on a computer having a random access memory (RAM) and an attached disk array that skips predetermined full reboot steps comprising the steps of:
directing a boot mechanism that carries out the full reboot steps to undergo a warm reboot;
retaining an uncleared reserved storage space in the RAM for storing a copy of an operating system kernel; and
after predetermined warm reboot steps are performed, generating an operative operating system kernel in a portion of the RAM outside the reserved storage space from the copy of the operating system kernel in the reserved storage space.

23. The method as set forth in claim 22 wherein the step of generating includes uncompressing a compressed image of the operating system kernel.

24. The method as set forth in claim 23 wherein the step of generating further includes copying the compressed image of the operating system kernel to a location within the portion of the RAM outside the reserved storage location.

25. The method as set forth in claim 23 wherein the step of generating includes performing an error check on the copy of the operating system kernel and, if the copy of the operating system kernel is corrupted, reverting to the full reboot steps.

26. The method as set forth in claim 23 wherein the full reboot steps include (a) clearing the reserved storage space, (b) loading, from the disk array, a copy of the operating system kernel (c) copying the copy of the operating system kernel to the reserved storage space.

27. The method as set forth in claim 26 wherein the full reboot steps further comprise at least one of (a) fully clearing the memory, and (b) performing a full test of the memory.

28. A method for fast reboot of a computer having the random access memory comprising the steps of:
  performing predetermined reboot steps with a boot mechanism; and
  reloading an operating system kernel extracted from a stored operating system kernel image, the operating system kernel image being stored in a reserved location of the random access memory prior to the step of performing the predetermined reboot steps, the reserved location remaining uncleared after the step of performing the predetermined reboot steps.

29. A method for rebooting a computer comprising the steps of:
  in response to a predetermined reboot command, selectively reloading an operating system kernel to a memory of the computer from either a first compressed kernel image of the operating system or a second compressed kernel image of the operating system, each of the first compressed kernel image and the second compressed kernel image being located on different non-removable storage media, wherein an access speed for the first compressed kernel image is quicker than an access speed for the second compressed kernel image.

30. The method as set forth in claim 29 further comprising storing the first compressed kernel image on a reserved space of the memory that remains uncleared during a warm reboot process having predetermined warm reboot steps and storing the second compressed kernel on a disk operatively interconnected to the computer.

31. The method as set forth in claim 30 wherein the step of storing the first compressed kernel image includes loading a copy of the second compressed kernel image onto the reserved space during a full reboot process that includes both full reboot steps and the predetermined warm reboot steps.

32. The method as set forth in claim 31 wherein the full reboot steps include clearing the memory, including the reserved storage space and testing each of an LCD display chip and a serial input/output (SIO) chip.

33. An operating system for a computer having an operating system kernel stored in a random access memory of the computer comprising:
  a warm reboot instruction, responsive to a predetermined reboot condition, that sets an indicator in a boot mechanism of the computer to perform a warm reboot process that includes predetermined boot steps that are fewer than the boot steps performed by the boot mechanism in response to a full reboot instruction; and
  a compressed kernel image located at a reserved storage space in the random access memory, the compressed kernel image being adapted to be accessed to reload the compressed kernel image into the random access memory during a warm reboot process.

34. The operating system as set forth in claim 33 wherein the boot steps of the full reboot process include mechanisms for fully clearing the random access memory and reloading a compressed kernel image of the operating system from a disk into the random access memory.

35. The operating system as set forth in claim 34 wherein the compressed kernel image is located at a reserved storage space in the random access memory that is remote from the area controlled by the operating system and that remains uncleared during the warm reboot process.

36. The operating system as set forth in claim 33 wherein the warm reboot instruction is based upon a condition in the computer that requires only the boot steps of the warm reboot process and that allows the boot steps of the full reboot process to be skipped.

37. The operating system as set forth in claim 33 wherein the indicator includes a plurality of warm reboot levels that enable each of the boot steps of the full reboot process to be selectively performed or skipped.

38. The method as in claim 1, wherein the attached disk array is one or more disks.

39. The system as in claim 14, wherein the attached disk array is one or more disks.

40. The computer-readable media as in claim 18, wherein the attached disk array is one or more disks.

41. The method as in claim 22, wherein the attached disk array is one or more disks.

42. A method for fast reboot of a computer, the computer having an operating system loaded from a first memory, the method comprising the steps of:
  saving a copy of an operating system in a second memory, the second memory having faster access than the first memory;
  performing predetermined reboot operations; and
  reloading the operating system from the operating system copy in the second memory.

43. The method as in claim 42, further comprising the step of: compressing the copy of the operating system in the second memory.

44. The method as in claim 43, further comprising the step of: uncompressing the copy of the operating system.

45. The method as in claim 42, wherein the copy of the operating system is located at a reserved storage space in the second memory that is remote from an area controlled by the operating system and that remains uncleared during the fast reboot process.

46. The method as in claim 42, wherein the step of performing predetermined reboot operations further comprises skipping at least one step selected from the group consisting of: performing a full memory test, reloading an operating system from the first memory, clearing system memory, testing an LCD display chip, and testing a serial input/output (SIO) chip.

47. The method as in claim 42, further comprising: setting a flag indicating the fast reboot.

48. The method as in claim 42, wherein the second memory is a volatile memory.

49. The method as in claim 48, wherein the second memory is a RAM.

50. The method as in claim 42, wherein the second memory is a non-volatile memory.

51. The method as in claim 50, wherein the second memory is an NVRAM.

52. The method as in claim 50, wherein the second memory is a flash memory.

53. The method as in claim 42, wherein the first memory is a disk memory.

54. A computer for performing a fast reboot, the computer comprising:
  a first memory;
  an operating system loaded from the first memory;
  a second memory to save a copy of the operating system, the second memory having faster access than the first memory; and
  a boot mechanism to perform predetermined reboot operations, including reloading the operating system from the operating system copy in the second memory.

55. The computer as in claim 54, wherein the operating system is compressed in the second memory.

56. The computer as in claim 55, wherein the operating system is uncompressed by the boot mechanism.

57. The computer as in claim 54, further comprising: a reserved storage space in the second memory that is remote from an area controlled by the operating system and that remains uncleared during the fast reboot process, the reserved storage space to save the copy of the operating system.

58. The computer as in claim 54, wherein the predetermined reboot operations further comprise skipping at least one step selected from the group consisting of: performing a full memory test, reloading an operating system from the first memory, clearing system memory, testing an LCD display chip, and testing a serial input/output (SIO) chip.

59. The computer as in claim 54, further comprising: a flag to indicate the fast reboot.

60. The computer as in claim 54, further comprising: a volatile memory as the second memory.

61. The computer as in claim 60, further comprising: a RAM as the second memory.

62. The computer as in claim 54, further comprising: a non-volatile memory as the second memory.

63. The computer as in claim 62, further comprising: an NVRAM as the second memory.

64. The computer as in claim 62, further comprising: a flash memory as the second memory.

65. The computer as in claim 54, further comprising: a disk memory as the first memory.

66. A computer for performing a fast reboot, the computer comprising:
- a first memory;
- an operating system loaded from the first memory;
- means for saving a copy of an operating system in a second memory, the second memory having faster access than the first memory;
- means for performing predetermined reboot operations; and
- means for reloading the operating system from the operating system copy in the second memory.

67. The computer as in claim 66, further comprising: a volatile memory as the second memory.

68. The computer as in claim 66, further comprising: a non-volatile memory as the second memory.

69. The computer as in claim 66, further comprising: a disk memory as the first memory.

70. A computer readable media, comprising: said computer readable media containing instructions for execution in a processor on a computer having an operating system loaded from a first memory, the instructions for the practice of the method of,
- saving a copy of an operating system in a second memory, the second memory having faster access than the first memory;
- performing predetermined reboot operations; and
- reloading the operating system from the operating system copy in the second memory.

71. Electromagnetic signals propagating on a computer network, comprising: said electromagnetic signals carrying instructions for execution in a processor on a computer having an operating system loaded from a first memory, the instructions for the practice of the method of,
- saving a copy of an operating system in a second memory, the second memory having faster access than the first memory;
- performing predetermined reboot operations; and
- reloading the operating system from the operating system copy in the second memory.

\* \* \* \* \*